(No Model.)

H. CROWTHER.
WRENCH.

No. 288,927.

Patented Nov. 20, 1883.

WITNESSES:

INVENTOR:
Henry Crowther
by Joseph A. Miller & Co.
Atty's

UNITED STATES PATENT OFFICE.

HENRY CROWTHER, OF PROVIDENCE, RHODE ISLAND, ASSIGNOR OF ONE-FOURTH TO WILLARD L. CHAFFEE, OF SAME PLACE.

WRENCH.

SPECIFICATION forming part of Letters Patent No. 288,927, dated November 20, 1883.

Application filed May 14, 1883. (No model.)

*To all whom it may concern:*

Be it known that I, HENRY CROWTHER, of the city and county of Providence, State of Rhode Island, have invented a new and useful Improvement in Wrenches; and I hereby declare the following to be a full, clear, and exact description of the same, reference being had to the accompanying drawings, forming part of this specification.

This invention has reference to an improvement in wrenches used for grasping round bars or pipes, such as are known in the art as "pipe-wrenches;" and it consists in the peculiar and novel construction of the wrench, as will be more fully set forth hereinafter.

Pipe-tongs have heretofore been constructed with one lever formed at the end into the form of a hook having two surfaces intersect at a pointed angle, and a nipping-lever, so that the pipe was wedged into the pointed angle of the hook on one lever and nipped to hold the same against rotation by the nipping-lever. Pipe-wrenches have been made with two roughened surfaces, preferably serrated with ratchet-shaped teeth, which were brought against the pipe or rod to grasp the same.

My improved pipe-wrench is provided with a loosely-hinged serrated hooked lever, the pivotal motion of which is limited, and the nipping-lever provided with a series of ratchet-teeth, so that while the pivotal connection is not adjustable the wrench will adjust itself to a considerable range of pipes, so that pipes varying in diameter can, within certain limits, be grasped and firmly held by the same, which is not the case with other pipe tongs or wrenches.

Figure 1:
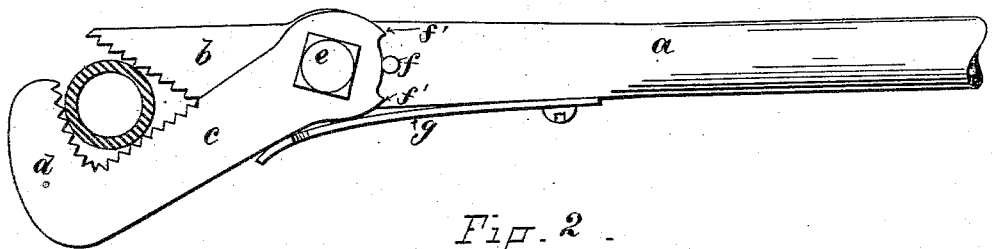
Figure 2:
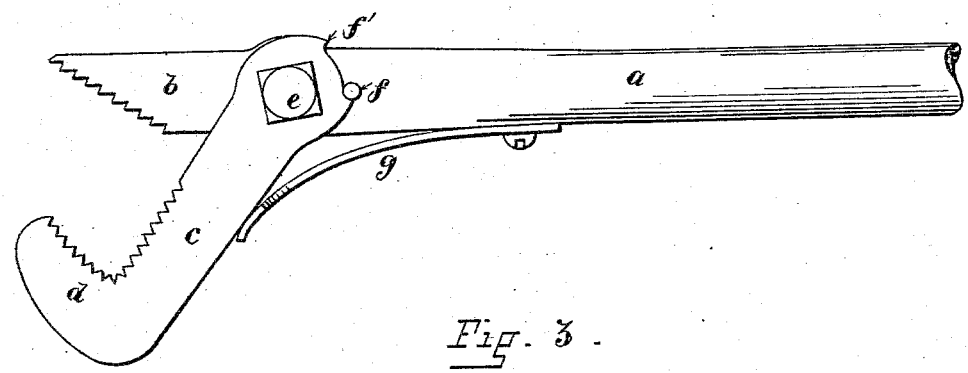
Figure 3:
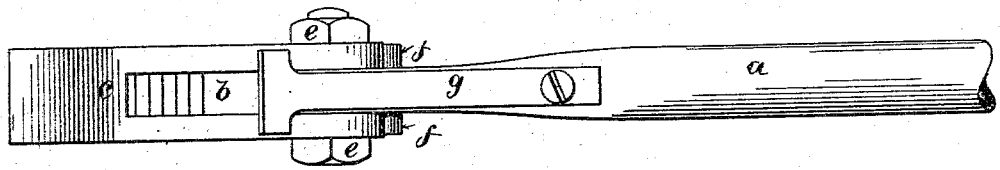

Figure 1 is a view of my improved pipe-wrench, showing the same as holding a pipe of about the medium diameter of the pipes that can be held with the same. Fig. 2 is a view showing the wrench in the position when holding a pipe of the largest diameter for which it is constructed. Fig. 3 is a side view of the wrench, showing the spring by which the hinged lever is pressed.

In the drawings, $a$ is the handle or operating-lever. $b$ is the nipping end of the same. Instead of ending in one nipping-tooth, the end $b$ is provided with a large number of nipping-teeth, so that the same will adjust itself to a variety of diameters of pipe. $c$ is the hinged lever having the projecting hook $d$, formed so that the inner surface of the same forms a pointed angle, said surface being provided with pointed teeth to firmly grasp the pipe or rod. The lever $c$ is pivotally secured to the hand-lever $a$ by the bolt $e$. When used, the rod or pipe to be held is placed in the hook $c$ $d$, or rather the hook is placed over the same and the end of the hand-lever $a$ brought to bear against the same. To facilitate this the lever $c$ must be prevented from swinging back against the hand-lever $a$, and for this purpose the pin $f$ is fixed in the hand-lever $a$, while the lever $c$ is provided with the two stops, $f'$ $f'$, so that the pivotal motion of the hinged lever $c$ is limited by the said stops $f'$ $f'$. The spring $g$ may also be used to hold the hinged lever $c$ in position. A rod or pipe within the limits of the wrench can be quickly and firmly held and be turned with great force.

Having thus described my invention, I claim as new and desire to secure by Letters Patent—

The combination, with the lever $a$, provided with the toothed nipping end $b$, of the lever $c$, hinged at the fixed bolt $e$, provided with the hook $d$, the inner surface being provided with teeth arranged to grasp pipes or rods of various diameters, the pin $f$, and stops $f'$ $f'$, constructed to limit the motion of the lever $c$, as described.

HENRY CROWTHER.

Witnesses:
  M. F. BLIGH,
  J. A. MILLER, Jr.